SPATIAL FILTERING SYSTEM FOR PERFORMING DIFFERENTIATION

Filed Oct. 18, 1966 3 Sheets-Sheet 1

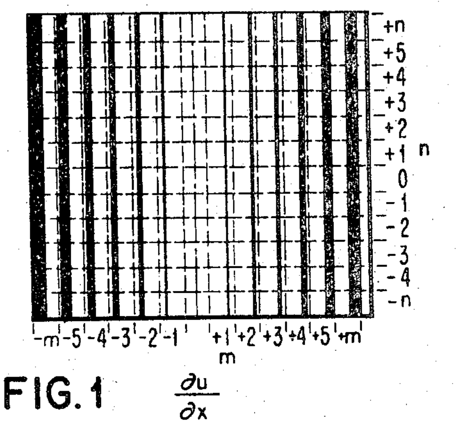

FIG. 1 $\frac{\partial u}{\partial x}$

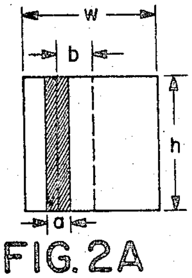

FIG. 2A

FIG. 2B

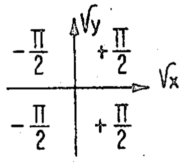

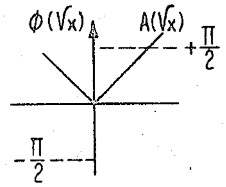

FIG. 2C

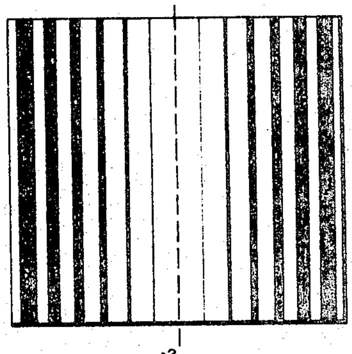

FIG. 3 $\frac{\partial^2 u}{\partial x^2}$

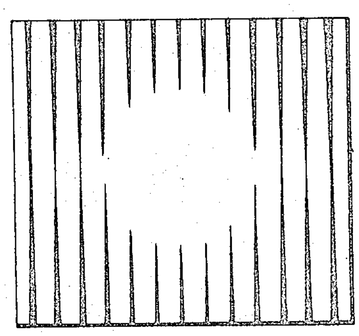

FIG. 4 $\frac{\partial^2 u}{\partial x^2} + \frac{\partial^2 u}{\partial y^2}$

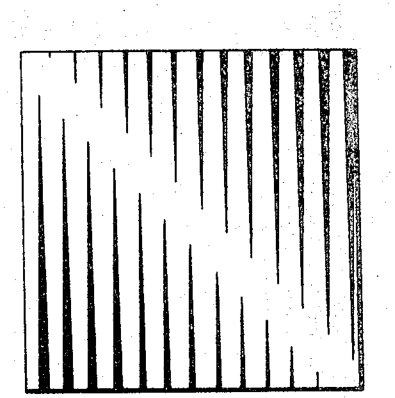

FIG. 5 $\frac{\partial u}{\partial x} + \frac{\partial u}{\partial y}$

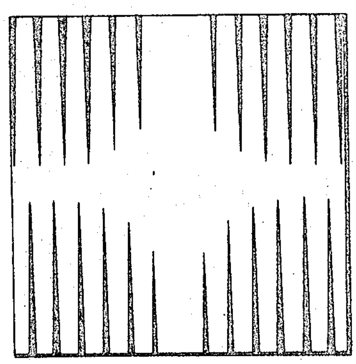

FIG. 6 $\frac{\partial^2 u}{\partial x \partial y}$

*INVENTOR*
ADOLF W. LOHMANN

BY [signature]

ATTORNEY

INVENTOR
ADOLF W. LOHMANN

By [signature]
ATTORNEY

SPATIAL FILTERING SYSTEM FOR PERFORMING DIFFERENTIATION

Filed Oct. 18, 1966

*INVENTOR*
ADOLF W. LOHMANN

BY [signature]
ATTORNEY

United States Patent Office 3,488,106
Patented Jan. 6, 1970

3,488,106

SPATIAL FILTERING SYSTEM FOR PERFORMING DIFFERENTIATION

Adolf W. Lohmann, Los Gatos, Calif., assignor to International Business Machines Corporation, Armonk, N.Y., a corporation of New York Filed Oct. 18, 1966, Ser. No. 587,474
Int. Cl. G02b 5/20
U.S. Cl. 350—162 13 Claims

ABSTRACT OF THE DISCLOSURE

An optical filter, such as a mask, is described for performing binary differentiation. Four optical masks are described and represent $$\frac{\partial u}{\partial x},\ \frac{\partial^2 u}{\partial x^2},\ \frac{\partial^2 u}{\partial x^2}+\frac{\partial^2 u}{\partial y^2},\ \text{and}\ \frac{\partial^2 u}{\partial x \partial y}$$

The primary application of the filter representing $\partial u/\partial x$ is in a differential interference microscope and the other filters are used in optical processing of reconnaissance photographs. For example, the filter representing $\partial^2 u/\partial x \partial y$ provides an output representative to corners or crosses while the filter representing $\partial^2 u/\partial y^2$ detects randomly oriented edges to that both are useful in processing photographs.

This invention relates generally to optics and particularly to a spatial filter for the performance of differential functions on a wave.

The differentiation of an optical wave is frequently desirable. For example, an optical wave which is differentiated with respect to a given dimension will have all gradients which are perpendicular to that dimension sharply enhanced. Such an operation is often effective in recovering information which has been lost or degraded. A differentiated wave $\partial u/\partial x$ will also reveal phase differences which are normally invisible to the eye. Phase differences commonly result from objects which are essentially transparent.

Various combinations of the differentiation process can be used to recognize certain shapes and objects. The operation $\partial^2 u/\partial x \partial y$ is useful for the detection of corners.

$$\frac{\partial^2 u}{\partial x^2}+\frac{\partial^2 u}{\partial y^2}$$

can be utilized for the detection of arbitrarily oriented edges. The second derivative $\partial^2 u/\partial x^2$, and the function $$\frac{\partial u}{\partial x}+\frac{\partial u}{\partial y}$$

also find application.

One way of performing these operations on an optical wave is to digitize the optical signal after dividing the image into segments. Once the image has been digitized, the differential operations can be performed on a conventional computer. This approach to the problem is somewhat cumbersome since it requires conversion of analog data into digital form and subsequent reconversion into an analog output signal. Furthermore, there are applications such as those in the medical field where this approach is impractical. It is, therefore, desirable to perform these operations in real time with optical elements which can operate directly on the optical wave without the necessity for intermediate conversion steps.

A discussion of these operations and various approaches to a solution is contained in "Image Transformations for Pattern Recognition Using Incoherent Illumination and Bipolar Aperture Masks" by E. A. Trabka and P. G. Roetling, which appeared in the Journal of the Optical Society of America, vol. 54, No. 10, pp. 1242–1252. The filters suggested in that article depend on very rough approximations and, therefore, were not entirely adequate for the intended purpose. It is recognized that performance of these operations by means of filters would be very desirable provided that the results were accurate and the filters themselves were not difficult to design or to fabricate. All approaches to this problem have been inadequate either from the standpoint of the results obtained or the hardware necessary to obtain satisfactory results.

It is, therefore, an object of my invention to provide an improved binary filter for the performance of differential operations on an optical wave.

Another object of my invention is to provide a binary mask as an optical filter element which can be used to control the phase and amplitude of an optical wave to perform the function of differentiation.

Still another object of my invention is to provide an optical system for the performance of differential operations on an optical wave.

The foregoing and other objects, features and advantages of the invention will be apparent from the following more particular description of preferred embodiments of the invention, as illustrated in the accompanying drawings.

FIGURE 1 shows a binary mask for the performance of the operation $\partial u/\partial x$.

FIGURE 2*a* shows a segment of a binary mask.

FIGURE 2*b* shows the phase relationship over the area of the mask of FIGURE 1.

FIGURE 2*c* shows the phase and amplitude relationship over the area of the mask of FIGURE 1.

FIGURE 3 shows a mask for the performance of the operation. $\partial^2 u/\partial x^2$.

FIGURE 4 shows a mask for the performance of the operation $$\frac{\partial^2 u}{\partial x^2}+\frac{\partial^2 u}{\partial y^2}$$

FIGURE 5 shows a mask for the performance of the operation $$\frac{\partial u}{\partial x}+\frac{\partial u}{\partial y}$$

FIGURE 6 shows a mask for the performance of the operation $\partial^2 u/\partial x \partial y$.

Figure 7:
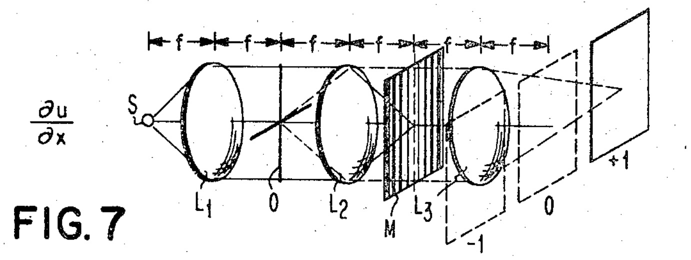
FIGURE 7 is an optical system for the performance of $\partial u/\partial x$ and other differential operations.

The filter shown in FIGURE 1 consists of a series of lines superimposed on a background. While the lines are shown as the opaque elements of the filter in this figure, this is done for convenience only. In most applications, the lines would be transparent and the background would be opaque. When this filter is inserted in an appropriate optical system at the correct position with respect to the object and the desired image it can be made to very closely approximate the transfer function below:

(1) $$A(xy)e^{i\phi(xy)}$$

where

A(*xy*) represents the amplitude characteristic of the filter at the point designated by the coordinates *x* and *y*;

$\phi(xy)$ represents the phase characteristic of the filter at the point designated by the coordinates $x$ and $y$.

When the appropriate transfer function of the performance of the desired differential operation has been determined, it is then possible to construct a filter from this information merely by tailoring the characteristics of the filter to match those of the desired function.

The filter shown in FIGURE 1 is divided into a plurality of small cells as indicated by the dotted lines. The cells are arranged according to the indices $m$ and $n$ as shown in the drawing. A detail of one cell is shown in FIGURE 2$a$. Each cell includes an opaque line having a width $a$, having its center located at a distance $b$ from the center of the cell. This width of each cell is designated $w$ and the height is termed $h$.

In order to fabricate a filter that has a particular amplitude and phase transfer function, it is necessary to have previously determined the value of the function in terms of phase and amplitude at the index point corresponding to each cell. Once this has been done, the following expressions can be used to locate the center of the opaque line and also to determine the correct width.

The width $a$ of the opaque line is determined according to the expression:

(2)
$$a_{nm}=\frac{w}{2\pi}\text{ arc sin }\left(\frac{A_{nm}}{A_{max}}\right)$$

The distance $b$ representing the center to center distance between the cell and the opaque line is determined according to the expression:

(3)
$$b_{nm}=\frac{w}{2\pi}\phi_{nm}$$

where $w$ is the width of the cell;

$A_{nm}$ is the value of the modulus of the filter function at the cell located at the position determined by the coordinates $n$ and $m$;

$\phi_{nm}$ is the value of the phase characteristic at the cell located at the position determined by the coordinates $n$ and $m$;

$A_{max}$ is the maximum value of the modulus of the filter function.

Looking now to the system shown in FIGURE 7, a source of light S is positioned at a distance $f$ from lens $L_1$. An object O is located at a distance $f$ from lens $L_1$ and a distance $f$ from lens $L_2$. The object O is shown simply as a plane. The filter element such as mask M is located at a distance $f$ from lens $L_2$ and a distance $f$ from lens $L_3$. The resulting image occurs at a distance $f$ from the lens $L_3$ and displaced from the axis of the system since the first diffraction order is used. As shown in FIGURE 1, the +1st order is used, but this could as well be the −1st order. The point source S is both spectrally and phase coherent and preferably takes the form of a laser. Lenses $L_1$, $L_2$ and $L_3$ have identical focal lengths $f$ for the purpose of simplification of the system description.

The size of the cells in mask M is a function of the size of the object. The width $w$ is determined according to the expression:

(4)
$$w=\lambda f/\Delta x$$

where $\lambda$ is the wavelength of the radiation emitted by light source S;

$f$ is the focal length of lens $L_1$;

$\Delta x$ is the width of the object O.

Similarly, the height of the cell $h$ is a funciton of the size of the object as determined by the expression:

(5)
$$h=\lambda f/\Delta y$$

where $y$ is the height of the object O.

This definition of cell size is for the purpose of description only. It will be recognized that the selection of other lens systems will alter the foregoing relationship. The relative positions of the various lenses, object, filter and image as shown in FIGURE 1 are also illustrative only. The position of the filter in the Fourier domain of the source is essential. In general, the object is positioned in the collimated beam from the source and the filter is positioned in a collimated beam representing the radiation from the source which has been modified by the object.

The description of the manner in which phase and amplitude control have been achieved in the filter is illustrative of only one of a variety of ways which may be utilized. A description of alternative configurations for the mask M is contained in my copending application, Ser. No. 456,127 filed May 17, 1965, now abandoned. Briefly, these alternatives consist of substituting two lines in each cell for the single line as shown, or the use of a dashed line which does not extend the full height of the cell. In the case where the two lines are used, the separation between them determines the amplitude characteristic and the position of the two lines within the cell determines the phase. Where a dashed line is used, the length of the line is determinative of the amplitude characteristic and the position of the line determines the phase.

The construction of the mask used as the filter M in the system of FIGURE 1 to perform differentiation, begins with the derivation of the expression which defines the phase and amplitude operations on the wave produced by the object.

The complex amplitude of the object is:

(6)
$$u(x,y)=\int\int\tilde{u}(\nu_x,\nu_y)e^{2\pi i(x\nu_x+y\nu_y)}d\nu_x d\nu_y$$

where $\tilde{u}$ is the frequency spectrum of the object;

$\nu_x$ is spatial frequency components in the $x$ dimension;

$\nu_y$ is spatial frequency components in the $y$ dimension;

$x$ is the coordinate in the $x$ dimension of the object plane;

$y$ is the coordinate in the y dimension of the object plane;

$d\nu_x$ is the differential of the frequency component in the $x$ dimension;

$d\nu_y$ is the differential of the frequency component in the $y$ dimension.

The wanted output:

(7)
$$v(x,y)=\frac{\partial u(x,y)}{\partial x}=\frac{\partial}{\partial x}\left\{\int\int\tilde{u}(\nu_x,\nu_y)e^{2\pi i(x\nu_x+y\nu_y)}d\nu_x d\nu_y\right\}$$

(8)
$$=\int\int\tilde{u}(\nu_x\nu_y)\frac{\partial\{e^{2\pi ix\nu_x}\}}{\partial x}e^{2\pi i\nu_y y}d\nu_x d\nu_y$$

Differentiating:

(9)
$$\frac{\partial\{e^{2\pi i\nu_x x}\}}{\partial x}=2\pi i\nu_x e^{2\pi ix\nu_x}$$

Substituting:

(10)
$$v(x,y)=\int\int 2\pi i\nu_x\tilde{u}(\nu_x\nu_y)e^{2\pi i(x\nu_x+y\nu_y)}d\nu_x d\nu_y$$

Then the frequency spectrum of the image

(11)
$$\tilde{v}=2\pi i\nu_x\tilde{u}$$

Substituting:

(12)
$$v(xy)=\int\int\tilde{v}(\nu_x\nu_y)e^{2\pi i(\nu_x x+\nu_y y)}d\nu_x d\nu_y$$

The cordinate system, i.e., $x$ and $y$, are centered on the optical axis. That is, the reference point for $x$ and $y$ is the optical axis.

In general the filter function F is the ratio of the image spectrum divided by the object spectrum

(13)
$$F=\frac{\tilde{v}}{\tilde{u}}$$

(14)
$$\frac{\tilde{v}}{\tilde{u}}=2\pi i\nu_x=F(\nu_x\nu_y)$$

The filter function can be split up into its modulus and phase factor:

(15) $$F(\nu_x, \nu_y) = \underbrace{A(\nu_x \nu_y)}_{\text{modulus}} \underbrace{e^{i\phi(\nu_x \nu_y)}}_{\text{phase factor}}$$

here

(16) $$A(\nu_x, \nu_y = 2\pi|\nu_x|$$

(17) $$e^{i\phi(\nu_x \nu_y)} = \begin{cases} +i \text{ if } \nu_x > 0 \\ -i \text{ if } \nu_x < 0 \end{cases}$$

Since

(18) $$+i = e^{+i\pi/2}$$

and

(19) $$-i = e^{-i\pi/2}$$

then

(20) $$\phi(\nu_x \nu_y) = \begin{cases} +\pi/2 \text{ if } \nu_x > 0 \\ -\pi/2 \text{ if } \nu_x < 0 \end{cases}$$

In a coherent image forming system, Fraunhofer diffraction takes place and the resulting diffraction pattern may be observed in the image plane of the point source. The law which defines Fraunhofer diffraction states that the frequency spectrum $n$ of the object is displayed as a Fraunhofer diffraction pattern. The frequency components $\nu_x$ and $\nu_y$ appear along the $x$ and $y$ coordinates in the Fraunhofer diffraction plane. The operation of spatial filtering means that the object spectrum $\tilde{u}$ has to be multiplied by the filter function F in order to give the frequency spectrum $\tilde{v}$ of the image. The multiplication of the object spectrum $\tilde{u}$ by the filter function F is performed physically by inserting the filter function F or a transparency in the Fraunhofer diffraction plane.

In this system the complex filter function is replaced by a binary mask which is a grating with varying widths and position of the grating slits. Such a binary mask is equivalent to a complex mask as far as the first grating diffraction order of the grating-like mask is concerned. The first grating diffraction order is the wanted image $v(xy)$.

The cell size is essentially the grating constant of the binary mask. This must be selected so that the 1st diffraction order does not overlap the O order.

With reference to FIGURE 5, it can be seen that the cell $nm$ with center at

(21) $$\nu_x = n\frac{\lambda f}{\Delta x}$$

(22) $$\nu_y = m\frac{\lambda f}{\Delta y}$$

(23) $$A\left(\frac{n\lambda f}{\Delta x}, \frac{m\lambda f}{\Delta y}\right) = 2\pi\lambda f \frac{n}{\Delta x} + \frac{m}{\Delta y} = A_{nm}$$

(24) $$\phi\left(\frac{n\lambda f}{\Delta x}, \frac{m\lambda f}{\Delta y}\right) = \phi_{nm} = \begin{cases} +\pi/2 \text{ if } |n+m| > 0 \\ -\pi/2 \text{ if } |n+m| < 0 \end{cases}$$

(25) $$A_{nm} = A_{max} \operatorname{Sin}\left(2\pi\frac{a_{nm}}{w}\right)$$

where $w = \lambda/\Delta x$.

Then the width

(26) $$a_{nm} = \frac{w}{2\pi} \text{arc sin}\left(\frac{A_{nm}}{A_{max}}\right)$$

where $A_{max}$ is the maximum of the modulus of the filter function;

(27) $$\phi_{nm} = 2\pi\frac{b_{nm}}{w}$$

(28) $$ib_{nm} = \frac{w}{2\pi}\phi_{nm} = \begin{cases} +\frac{w}{4} \text{ if } n+m > 0 \\ -\frac{w}{2} \text{ if } n+m < 0 \end{cases}$$

With reference to FIGURE 2$b$ it can be seen that the phase factor will be in the area of the filter to one side of the center and in the area on the other side of the filter. FIGURE 2$c$ illustrates the manner in which the amplitude function varies to either side of the center of the mask.

Insertion of the mask into the system of FIGURE 7 provides an image which has all gradients along the axis of differentiation sharply enhanced. Phase gradients are enhanced by converting them to amplitude gradients which renders them visible. Amplitude gradients are increased.

While the system of FIGURE 7 is limited to the performance of simple differentiation when the filter of FIGURE 1 is selected, various combinations of this system can be devised to perform other differential operations. For example, the second derivative $\partial^2 u/\partial x^2$ can be taken by connecting two systems according to FIGURE 7 in series in the manner shown in FIGURE 8. In this case, a point source of light S is positioned at a distance $f$ from lens $L_1$. An object O is located at a distance $f$ from lens $L_1$ and at a distance $f$ from lens $L_2$. The first image $I_1$ is developed at a distance $f$ from lens $L_3$. This image corresponds to the first derivative $\partial u/\partial x$ as developed in the system of FIGURE 7. Instead of viewing this first image, a second differentiation is performed. A lens $L_4$, located a distance $f$ from the first image $I_1$, develops an image of the effective source which is the mask $M_1$. The second mask $M_2$ is located at a distance $f$ from the lens $L_4$ which places it in the Fourier domain of the first image $I_1$. Lens $L_5$, located at a distance $f$ from the mask $M_2$, develops an image $I_2$ representing the second derivative $\partial^2 u/\partial x^2$ of the object O.

Figure 8:
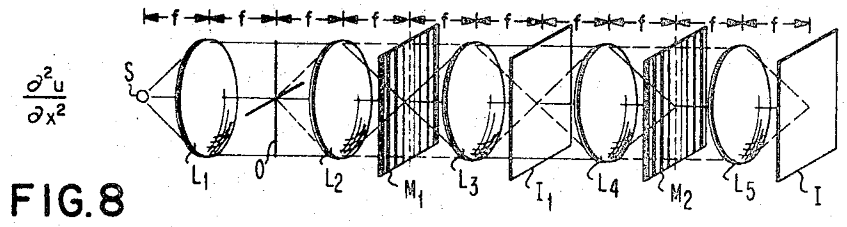
FIGURE 8 is an optical system for the performance of $\partial^2 u/\partial x^2$.

While FIGURE 8 shows the image $I_2$ as developed on the optical axis of the system, this is for the purpose of simplifying the drawing only. As in the case with the system of FIGURE 7, the image produced by the filter mask is that of the 1st diffraction order in each case.

Figure 9:
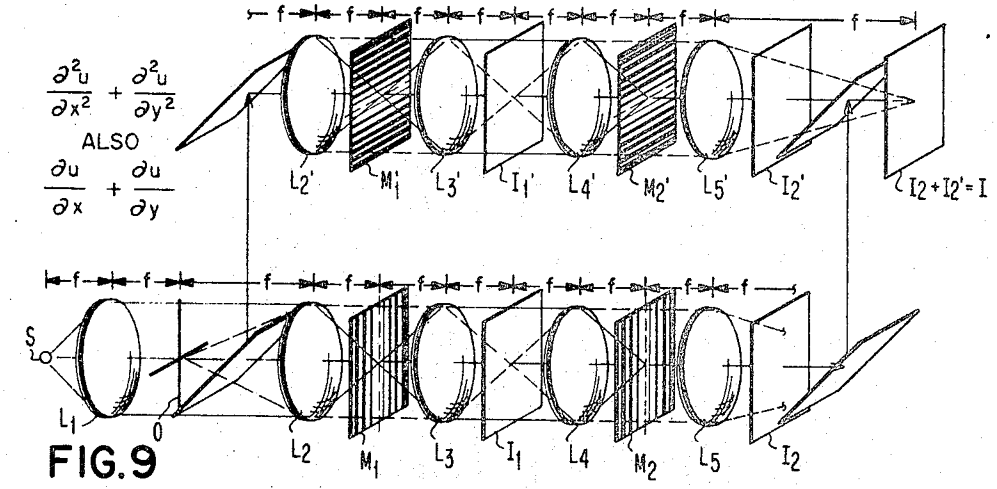
FIGURE 9 is an optical system for the performance of $$\frac{\partial^2 u}{\partial x^2}+\frac{\partial^2 u}{\partial y^2}\ \text{and}\ \frac{\partial u}{\partial x}+\frac{\partial u}{\partial y}$$

The system shown in FIGURE 9 performs the operation $$\frac{\partial^2 u}{\partial x^2} + \frac{\partial^2 u}{\partial y^2}$$

as it is shown, and with slight modification, performs the operation $$\frac{\partial u}{\partial x} + \frac{\partial u}{\partial y}$$

A point source of light S is positioned at a distance $f$ from the lens $L_1$. An object O is located at a distance $f$ from lens $L_1$. A beam splitter is interposed between the object O and the lens $L_2$. This beam splitter divides the radiation into two beams of equal amplitude. The first beam is directed to lens $L_2$, which is located at a distance $f$ from the object. The second beam is directed to a mirror which reflects the beam into lens $L_2'$, located at a distance $f$ from the object. Lens $L_2$ develops an image of the source in the plane of mask $M_1$, corresponding to the Fourier plane of the source. Lens $L_3$, located at a distance $f$ from the plane of mask $M_1$, develops a first image $I_1$ of the object at a distance $f$ from lens $L_3$ in the direction away from the source. Lens $L_4$, located at a distance $f$ from the image $I_1$, develops an image of the mask $M_1$ at a distance $f$ in the direction away from the source. Lens $L_5$ develops an image $I_2$ at a distance $f$ in the direction away from the source.

The second beam is operated on in a similar manner. The lens $L_2'$ develops an image of the source in the plane of the mask $M_1'$, corresponding to the Fourier plane of the source. Lens $L_3'$, located at a distance $f$ from the plane of mask $M_1'$, develops an image $I_1'$, of the object at a distance $f$ from the lens $L_3'$ in the direction away from the source. Lens $L_4'$, located at a distance $f$ from the image $I_1'$, develops an image of the mask $M_1'$ at a distance $f$ from lens $L_4'$ in the direction away from the source. Lens $L_5'$ develops an image $I_2'$ at a distance $f$ in the direction away from the source.

The images $I_2$ and $I_2'$ are then combined by means of the mirror and beam splitter which deflects the first beam into coincidence with the second beam. It will be recognized that relay lenses may be required to bring the images $I_2$ and $I_2'$ into proper combination. The resulting combination of $I_2$ and $I_2'$ provides an image I which corresponds to the operation $$\frac{\partial^2 u}{\partial x^2}+\frac{\partial^2 u}{\partial y^2}$$

The differentiation with respect to the $x$ dimension was achieved in the handling of the first beam. By shifting the axis of the filter masks 90° in the case of beam 2, it is possible to differentiate this beam with respect to the $y$ dimension. The resulting derivatives can then be combined to form the desired image.

It will be appreciated that the operation corresponding to $$\frac{\partial u}{\partial x}+\frac{\partial u}{\partial y}$$

can be performed simply by omitting the masks $M_2$ and $M_2'$ and combining the first and second beams after the first derivative is taken of each.

Figure 10:
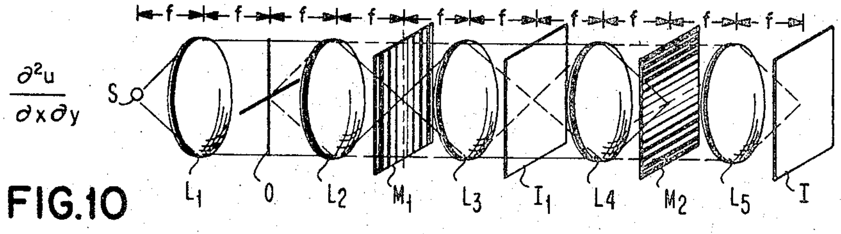
FIGURE 10 is an optical system for the performance of $\partial u^2/\partial x \partial y$.

In the system shown in FIGURE 10, the operation $\partial u^2/\partial x\partial y$ is performed. This system resembles that of FIGURE 8 with the exception that the mask $M_2$ has its axis rotated 90° with respect to that of mask $M_1$. Thus, instead of differentiating a second time with respect to the $x$ dimension, the second differentation is performed with respect to the $y$ dimension. As can be seen from a comparison of the two figures, the systems are identical in all other respects.

While the systems described thus far are adequate for the performance of the desired functions, a substantial simplification can be achieved by combining the various operations into a single mask and applying the resulting mask to the system of FIGURE 7. The manner of developing these masks is the same as that for the single mask used in FIGURE 7. The following is illustrative of the general derivation of single masks for the performance of the same operations as performed by the systems shown in FIGURES 7–10.

In general, the object is defined:

(29) $$u(x,y)=\int\int \tilde{u}(\nu_x,\nu_y)e^{2\pi i(x\nu_x+y\nu_y)}d\nu_x d\nu_y$$

The image which is desired is defined:

(30) $$v(x,y)=\int\int \tilde{v}(\nu_x,\nu_y)e^{2\pi i(x\nu_x+y\nu_y)}d\nu_x d\nu_y$$

For $du/dx$:

(31) $$\frac{\partial u(x,y)}{\partial x}=\int\int 2\pi i\nu_x \tilde{u}e^{2\pi i(x\nu_x+y\nu_y)}d\nu_x d\nu_y$$

From (13) and (14) which define the filter function:

(32) $$F=2\pi i\nu_x$$

In accordance with (15) A, the modulus of the filter function, is

(33) $$A=2\pi|\nu_x|$$

In accordance with (17) the phase factor is:

(34) $$e^{i\phi}=\begin{cases}+i \text{ if } \nu_x>0\\ -i \text{ if } \nu_x<0\end{cases}$$

and according to (20) the phase is:

(35) $$\phi=\begin{cases}+\frac{\pi}{2} \text{ if } \nu_x>0\\ -\frac{\pi}{2} \text{ if } \nu_x<0\end{cases}$$

For the cell identified by the index $nm$:

(36) $$A\left(\frac{n\lambda f}{\Delta x},\frac{m\lambda f}{\Delta y}\right)=\lambda f\left|\frac{n}{\Delta x}\right|=A_{nm}$$

and

(37) $$\phi\left(\frac{n\lambda f}{\Delta x},\frac{m\lambda f}{\Delta y}\right)=\phi nm=2\pi\frac{bnm}{w}$$

therefore

(38) $$A_{nm}=A_{max}\sin\left(\frac{2\pi a_{nm}}{w}\right)$$

where $w=\lambda f/\Delta x$.

The width of the strip in cell $nm$ is:

(39) $$a_{nm}=\frac{w}{2\pi}\arcsin\left(\frac{A_{nm}}{A_{max}}\right)$$

and

(40) $$\phi_{nm}=2\pi\frac{b_{nm}}{w}=\begin{cases}+\frac{\pi}{2}\\ -\frac{\pi}{2}\end{cases}$$

The location of the center of the strip in cell $nm$ is $b_{nm}$ from the center of the cell:

(41) $$b_{nm}=\begin{cases}+\frac{w}{4} \text{ if } n>0\\ -\frac{w}{4} \text{ if } n<0\end{cases}$$

The same general process may be used to evaluate the values $a_{nm}$ and $b_{nm}$ for the operation:

(42) $$\frac{\partial u(x,y)}{\partial x}+\frac{\partial u(x,y)}{\partial y}=\int\int(2\pi i\nu_x+2\pi i\nu_y)\tilde{u}e^{2\pi i(x\nu_x+y\nu_y)}d\nu_x d\nu_y$$

In a manner similar to (32) the filter function is:

(43) $$F=2\pi i(\nu_x+\nu_y)$$

The modulus of the filter function is:

(44) $$A=2\pi|\nu_x+\nu_y|$$

and the phase factor is:

(45) $$e^{i\phi}=\begin{cases}+i \text{ if } \nu_x+\nu_y>0\\ -i \text{ if } \nu_x+\nu_y<0\end{cases}$$

The phase is therefore

(46) $$\phi=\begin{cases}+\frac{\pi}{2} \text{ if } \nu_x+\nu_y>0\\ -\frac{\pi}{2} \text{ if } \nu_x+\nu_y<0\end{cases}$$

In the cell identified by the index $nm$

(47) $$A\left(\frac{n\lambda f}{\Delta x},\frac{m\lambda f}{\Delta x}\right)=\frac{2\pi\lambda f}{\Delta x}|n+m|$$

and

(48) $$\phi\left(\frac{n\lambda f}{\Delta x},\frac{m\lambda f}{\Delta x}\right)=\begin{cases}+\frac{\pi}{2} \text{ if } n+m>0\\ -\frac{\pi}{2} \text{ if } n+m<0\end{cases}$$

Therefore,

(49) $$A_{nm}=A_{max.}\frac{|n+m|}{n_{max.}+m_{max.}}$$

where $n_{max}$ and $m_{max}$ refer to the cells at the edges of the mask.

The width of the strip in cell $nm$ is

(50) $$a_{nm}=\frac{w}{2\pi}\arcsin\left(\frac{A_{nm}}{A_{max.}}\right)$$

and

(51) $$\phi_{nm}=\begin{cases}+\frac{\pi}{2} \text{ if } n+m>0\\ -\frac{\pi}{2} \text{ if } n+m<0\end{cases}$$

The location of the center of the strip in cell $nm$ is $b_{nm}$ from the center of the cell

(52)
$$b_{nm}=\begin{cases}+\frac{w}{4} \text{ if } n+m>0\\ -\frac{w}{4} \text{ if } n+m<0\end{cases}$$

For the operation $\partial^2u/\partial x^2$, the values $a_{nm}$ and $b_{nm}$ follow in the same manner:

(53)
$$\frac{\partial^2u}{\partial x^2}=\int\int(2\pi i\nu_x)^2\tilde{u}e^{2\pi i(x\nu_x+y\nu_y)}d\nu_xd\nu_y$$

The filter function is

(54)
$$F=-(2\pi)^2\nu_x^2$$

The modulus of the filter function is

(55)
$$A=2\pi\nu_x^2$$

and the phase factor is

(56)
$$e^{i\phi}=-1$$

The phase is, therefore,

(57)
$$\phi=\pi$$

Therefore,

(58)
$$A_{nm}=\left(n\frac{\lambda f}{\Delta x}\right)^2=A_{max.}\left(\frac{n}{n_{max.}}\right)^2$$

and the width of the strip in cell $nm$ is

(59)
$$a_{nm}=\frac{w}{2\pi}\text{ arc sin }\left(\frac{A_{nm}}{A_{max.}}\right)$$

and

(60)
$$\phi_{nm}=\pi$$

The location of the center of the strip in cell $nm$ is $b_{nm}$ from the center of the cell

(61)
$$b_{nm}=\frac{w}{2\pi}\phi_{nm}=\frac{w}{2}$$

For the operation $$\frac{\partial^2u}{\partial x^2}+\frac{\partial^2u}{\partial y^2}$$

the evaluation of $a_{nm}$ and $b_{nm}$ proceeds:

(62)
$$\frac{\partial^2u}{\partial x^2}+\frac{\partial^2u}{\partial y^2}=\iint[(2\pi i\nu_x)^2+(2\pi i\nu_y)^2]\tilde{u}e^{2\pi i(x\nu_x+y\nu_y)}d\nu_xd\nu_y$$

The filter function is

(63)
$$F=(2\pi i)^2(\nu_x^2+\nu_y^2)$$

The modulus of the filter function is

(64)
$$A=(2\pi)^2(\nu_x^2+\nu_y^2)$$

and the phase factor is

(65)
$$e^{i\phi}=-1$$

The phase is therefore

(66)
$$\phi=\pi$$

Therefore,

(67)
$$A_{nm}=\left(\frac{n\lambda f}{\Delta x}\right)^2+\left(\frac{m\lambda f}{\Delta y}\right)^2=A_{max.}\frac{n^2+m^2}{n_{max.}^2+m_{max.}^2}$$

and the width of the strip in cell $nm$ is

(68)
$$a_{nm}=\frac{w}{2\pi}\text{ arc sin }\left(\frac{A_{nm}}{A_{max.}}\right)$$

and

(69)
$$\phi_{nm}=\pi$$

The location of the center of the strip in cell $nm$ is $b_{nm}$ from the center of the cell

(70)
$$b_{nm}=\frac{w}{2\pi}\phi_{nm}=\frac{w}{2}$$

For the operation $\partial^2u/\partial x\partial y$; the evaluation of $a_{mn}$ and $b_{mn}$ follows:

(71)
$$\frac{\partial^2u}{\partial x\partial y}=\iint(2\pi i)^2\nu_x\nu_y\tilde{u}e^{2\pi i(x\nu_x+y\nu_y)}d\nu_xd\nu_y$$

The filter function is

(72)
$$F=(2\pi i)^2\nu_x\nu_y$$

The modulus of the filter function is

(73)
$$A=(2\pi)^2|\nu_x\nu_y|$$

and the phase factor is

(74)
$$e^{i\phi}=\begin{cases}+1 \text{ if } \nu_x>0,\ \nu_y<0 \text{ or } \nu_x<0,\ \nu_y>0\\ -1 \text{ if } \nu_x>0,\ \nu_y>0 \text{ or } \nu_x<0,\ \nu_y<0\end{cases}$$

The phase is therefore

(75)
$$\phi=\begin{cases}0 \text{ if } \nu_x>0,\ \nu_y<0 \text{ or } \nu_x<0,\ \nu_y>0\\ \pi \text{ if } \nu_x>0,\ \nu_y>0 \text{ or } \nu_x<0,\ \nu_y<0\end{cases}$$

Therefore,

(76)
$$A_{nm}=(2\pi)^2|nm|\frac{(\lambda f)^2}{\Delta x\Delta y}=A_{max.}\frac{|nm|}{n_{max.}m_{max.}}$$

and the width of the strip in cell $nm$ is

(77)
$$a_{nm}=\frac{w}{2\pi}\text{ arc sin }\left(\frac{A_{nm}}{A_{max.}}\right)$$

and

(78)
$$\phi_{nm}=\begin{cases}0 \text{ if } n>0,\ m<0 \text{ or } n<0,\ m>0\\ \pi \text{ if } n>0,\ m>0 \text{ or } n<0,\ m<0\end{cases}$$

The location of the center of the strip in cell $nm$ is $b_{nm}$ from the center of the cell

(79)
$$b_{nm}=\frac{w}{2\pi}\phi_{nm}=\begin{cases}0 \text{ if } n>0,\ m<0 \text{ or } n<0,\ m>0\\ \frac{w}{2} \text{ if } n>0,\ m>0 \text{ or } n<0,\ m<0\end{cases}$$

FIGURES 3, 4, 5 and 6 are semi-scale representations of the actual appearance of the filters for the operations $$\frac{\partial^2u}{\partial x^2},\ \frac{\partial^2u}{\partial x^2}+\frac{\partial^2u}{\partial y^2},\ \frac{\partial u}{\partial x}+\frac{\partial u}{\partial y}\text{ and }\frac{\partial^2u}{\partial x\partial y}$$

respectively.

While five differential operations have been shown, it will be recognized that the techniques set forth herein can be extended to other operations as well.

Similarly, while the filters have been suggested for use in a system according to FIGURE 7, other configurations are possible.

Figure 11:
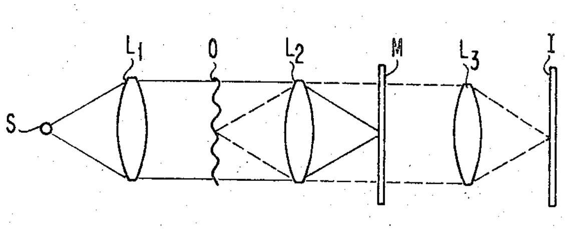
FIGURES 11–15 are illustrative of various other configurations for the performance of differential operations where only one mask is required.

In the arrangement of FIGURE 11, the placement of the components resembles that of FIGURE 7, but the distance between the object O and lens L, need not be $f$. The distance between the mask M and the lens $L_3$ need not be $f$.

Figure 12:
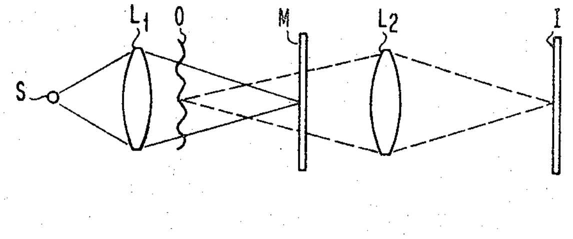

FIGURE 12 presents a system where the object O is located very close to lens $L_1$ and the mask M is located between the lens $L_2$ and the object. This configuration allows the operation to be achieved with but 2 lenses.

Figure 13:
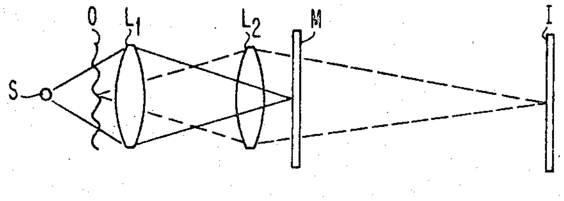

Another 2 lens version is shown in FIGURE 13. In this system the object is located close to lens $L_1$ inbetween the source and lens $L_1$. The mask M is positioned between lens $L_2$ and the image.

Figure 14:
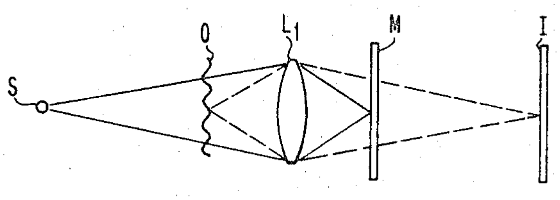

The filters can be used with a single lens as shown in FIGURE 14. Here, the object occurs between the source and lens $L_1$. The mask is positioned between lens $L_1$ and the image.

These systems all have certain characteristics in common. The mask is always located at the image plane of the source or, putting it another way, the Fourier plane of the object. Furthermore, the object must always be located between the source and the mask. Naturally, the image is positioned at a point where the object is brought to a focus.

Figure 15:
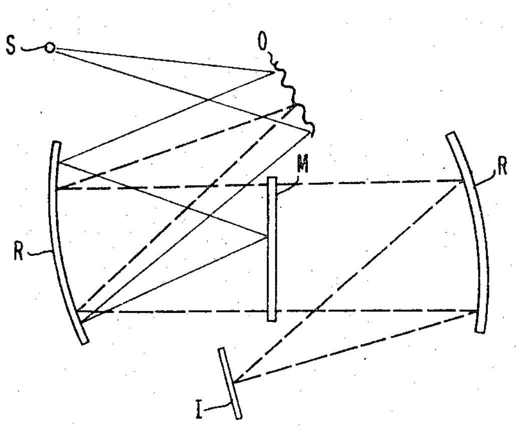

While the foregoing systems utilized lenses to bring the source and object to a focus, the use of mirrors is also possible as shown in FIGURE 15. Here the object O reflects light from the source S. A mirror R brings the source to a focus in the plane occupied by mask M. The light from object O passing through mask M is brought to a focus by mirror R at the image I.

In the foregoing description, the binary mask used to perform the filtering in the frequency plane was described as having areas which were opaque and areas which were transparent. This configuration is convenient for use in optical systems since it gives good results and is easy to fabricate.

Other binary masks can be used as well. For example, a mask could be made by evaporating a thin film onto a transparent background to give a 180° phase shift in the areas covered by the thin film.

A mirror type mask could be used having reflecting and absorbing areas. A mask could be made having clear areas and scattering areas. Such a mask could be made by etching a clear glass slide in the areas where scattering is desired, or by the use of a photovesicular film. Still another mask configuration would use areas which operate on the polarization of the wave, either by depolarization or rotation of the plane of polarization. Even the index of refraction could be varied by some means, such as ultrasonic waves, to produce a binary mask.

These variations extend to the optical embodiments. Since the relationships set forth apply to all waves which follow the stationary wave equation $$\frac{\partial^2 u}{\partial x^2}+\frac{\partial^2 u}{\partial y^2}+\frac{\partial^2 u}{\partial z^2}+\left(\frac{2\pi}{\lambda}\right)^2 u=0 \qquad (80)$$

other masks may be used in certain cases. In particular, a mask for use with electron waves could be similated by the use of inelastic scattering.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A spatial filter for performing the operation $\partial u/\partial x$ on a wave which follows the stationary wave equation where $u$ represents the complex amplitude of the wave, comprising:

a binary mask, said mask having a plurality of parallel cells having a width $w$ and being identified by an index $n$ centered on the optical axis of said wave, each of said cells containing a strip having a width $a$, the center of said strip being located at a distance $b$ from the center of said cell, said strip having a transparency which differs from that of the remainder of the cell, the value $a$ for the $n$th cell being defined:

$$a_n=\frac{w}{2\pi}\text{ arc sin }\left(\frac{A_n}{A_{max.}}\right)$$

and the value $b$ for the $n$th cell being defined:

$$b_n=\frac{w}{2\pi}\phi n$$

where $$A_n=\left|\frac{n}{n_{max.}}\right|A_{max.}$$

$A_{max}$ is the maximum of the modulus of the filter function;

$n_{max}$ is a cell at the outer edges of the mask;

$\phi=+\pi/2$ where $n>0$;

$\phi=-\pi/2$ where $n<0$, said cells being of a size such that the first diffraction order does not overlap the zero diffraction order.

2. A system for performing the operation $\partial u/\partial x$ on a wave which follows the stationary wave equation where $u$ represents the complex amplitude; said system comprising:

a coherent source of radiation;

an object which modifies a portion of the radiation from said source;

means for forming a Fourier transform of the object positioned in the path of modified radiation from said source;

a binary mask positioned in the Fourier transform of said object, which influences the modified radiation;

said mask having a plurality of parallel cells having a width $w$ and being identified by an index $n$ centered on the optical axis of said wave, each of said cells containing a strip having a width $a$, the center of said strip being located at a distance $b$ from the center of said cell, said strip having a transparency which differs from that of the remainder of the cell, the value $a$ for the $n$th cell being defined:

$$a_n=\frac{w}{2\pi}\text{ arc sin }\left(\frac{A_n}{A_{max.}}\right)$$

and the value $b$ for the $n$th cell being defined:

$$b_n=\frac{w}{2\pi}\phi n$$

where $$A_n=\left|\frac{n}{n_{max.}}\right|A_{max.}$$

$A_{max}$ is the maximum of the modulus of the filter function;

$n_{max}$ is a cell at the outer edges of the mask;

$\phi=+\pi/2$ where $n>0$, $\phi=-\pi/2$ where $n<0$, said cells being of a size such that the first diffraction order does not overlap the zero diffraction order, and means for forming an inverse Fourier transform of said object from the modified radiation influenced by said mask.

3. A spatial filter for performing the operation $\partial^2 u/\partial x^2$ on a wave which follows the stationary wave equation where $u$ represents the complex amplitude comprising:

a binary mask, positioned in the Fourier transformation of an object, which influences the modified radiation;

said mask having a plurality of parallel cells having a width $w$ and being identified by an index $n$ centered on the optical axis of said wave;

each of said cells containing a strip having a width $a$ the center of said strips being located at the center of said cell, said strip having a ttransparency which differs from that of the remainder of said cell;

the value $a$ for the cell of index $n$ being defined:

$$a_n=\frac{w}{2\pi}\text{ arc sin }\left(\frac{A_n}{A_{max.}}\right)$$

where $$A_n=\left(\frac{n}{n_{max.}}\right)^2 A_{max.}$$

$A_{max}$ is the maximum amplitude transmission of said mask, $n_{max}$ is a cell at the outer edges of the mask, said cells being of a size such that the first diffraction order does not overlap the zero diffraction order.

4. A system for performing the opeartion $\partial^2 u/\partial x^2$ on a wave which follows the stationary wave equation where $u$ represents the complex amplitude, comprising:

a coherent source of radiation;

an object which modifies, in phase and/or amplitude, a portion of the radiation from said source;

means for forming a Fourier transform of the object positioned in the path of modified radiation from said source;

a binary mask, positioned in the Fourier transform of said object, which influences the modified radiation, said mask having a plurality of parallel cells having a width $w$ and being identified by an index $n$ centered on the optical axis of said wave;

each of said cells containing a strip having a width $a$ the center of said strips being located at the center of said cell, said strip having a transparency which differs from that of the remainder of said cell; the value $a$ for the cell of index $n$ being defined:

$$a_n=\frac{w}{2\pi}\text{ arc sin }\left(\frac{A_n}{A_{max.}}\right)$$

where $$A_n=\left(\frac{n}{n_{max.}}\right)A_{max.}$$

$A_{max}$ is the maximum amplitude transmission of said mask, $n_{max}$ is a cell at the outer edges of the mask, said cells being of a size such that the first diffraction order does not overlap the zero diffraction order, and means for forming an inverse Fourier transform of said object from the modified radiation influenced by said mask.

5. A spatial filter for performing the operation $$\frac{\partial u}{\partial x}+\frac{\partial u}{\partial y}$$

on a wave which follows the stationary wave equation where $u$ represents the complex amplitude, comprising:

a binary mask, positioned in the Fourier transformation of an object which influences the modified radiation;

said mask having a plurality of cells having a width $w$ and a height $h$ and being identified by a set of indices $n$ and $m$ centered on the optical axis of said wave;

each of said cells containing a strip having a width $a$ the center of said strip being located at a distance $b$ from the center of said cell, said strip having a transparency which differs from that of the remainder of said cell;

the value $a$ for the lell of index $nm$ being defined:

$$a_{nm}=\frac{w}{2\pi}\text{ arc sin }\left(\frac{A_{nm}}{A_{max.}}\right)$$

and the value $b$ for the cell of index $nm$ being defined:

$$b_{mn}=\frac{w}{2\pi}\phi nm$$

where $$A_{mn}=\left|\frac{n+m}{n_{max.}+m_{max.}}\right|A_{max.}$$

$A_{max}$ is the maximum of the modulus of the filter function;

$n_{max}$ is the cell at the outer edges of the mask in the $x$ dimension;

$m_{max}$ is a cell at the outer edges of the mask in the $y$ dimension;

$\phi=u/4$ if $|n+m|>0$.

$\phi=-u/4$ if $|n+m|<0$, said cells being of a size such that the first diffraction order does not overlap the zero diffraction order.

6. A system for performing the operation $$\frac{\partial u}{\partial x}+\frac{\partial u}{\partial y}$$

on a wave which follows the stationary wave equation where $u$ represents the complex amplitude, comprising:

a coherent source of radiation;

an object which modifies in phase and/or amplitude;

a portion of the radiation from said source;

means for forming a Fourier transform of the object positioned in the path of modified radiation from said source;

a binary mask, positioned in the Fourier transform of said object which influences the modified radiation;

said mask having a plurality of cells having a width $w$ and a height $h$ and being identified by a set of indices $n$ and $m$ centered on the optical axis of said wave;

each of said cells containing a strip having a width $a$ the center of said strip being located at a distance $b$ from the center of said cell, said strip having a transparency which differs from that of the remainder of said cell;

the value $a$ for the cell of index $nm$ being defined:

$$a_n=\frac{w}{2\pi}\text{ arc sin }\left(\frac{A_n}{A_{max}}\right)$$

and the value $b$ for the cell of index $nm$ being defined:

$$b_{nm}=\frac{w}{2\pi}\phi nm$$

where $$A_{nm}=\left|\frac{n+m}{n_{max}+m_{max}}\right|A_{max}$$

$A_{max}$ is the maximum of the modulus of the filter function;

$n_{max}$ is the cell at the outer edges of the mask in the $x$ dimension;

$m_{max}$ is a cell at the outer edges of the mask in the $y$ dimension;

$=u/4$ if $n+m>0$ $\phi=u/2$ if $n+m<0$ said cells being of a size such that the first diffraction order does not overlap the zero diffraction order; and means for forming an inverse Fourier transform of said object from the modified radiation influenced by said mask.

7. A spatial filter for performing the operation $$\frac{\partial^2 u}{\partial x^2}+\frac{\partial^2 u}{\partial y^2}$$

on a wave which follows the stationary wave equation where $u$ represents the complex amplitude, comprising:

a binary mask, positioned in the Fourier transformation of an object which influences the modified radiation;

said mask having a plurality of cells having a width $w$ and a height $h$ and being identified by a set of indices $n$ and $m$ centered on the optical axis of said wave, each of said cells containing a strip having a width of the center of said strip being located at the center of said cell, said strip having a transparency which differs from that of the remainder of said cell;

the value $a$ for the cell of index $nm$ being defined:

$$A_{nm}=\frac{w}{2\pi}\text{ arc sin }\left(\frac{A_{nm}}{A_{max}}\right)$$

$$A_{nm}=\left|\frac{n^2+m^2}{n^2_{max}+m^2_{max}}\right|A_{max}$$

$A_{max}$ is the maximum of the modulus of the filter function, $n_{max}$ is a cell at the outer edge of the mask in the $x$ dimension, $m_{max}$ is a cell at the outer edge of the mask in $y$ dimension, said cells being of a size such that the first diffraction order does not overlap the zero diffraction order.

8. A system for performing the operation $$\frac{\partial^2 u}{\partial x^2}+\frac{\partial^2 u}{\partial y^2}$$

on a wave which follows the stationary wave equation where $u$ represents the complex amplitude, comprising:

a coherent source of radiation;

an object which modifies in phase and/or amplitude; a portion of the radiation from said source;

means for forming a Fourier transformer of the object positioned in the path of modified radiation from said source;

a binary mask, positioned in the Fourier transform of said object, which influences the modified radiation;

said mask having a plurality of cells having a width $w$ and a height $h$ and being identified by a set of indices $n$ and $m$ centered on the optical axis of said wave, each of said cells containing a strip having a width of the center of said strip being located at the center of said cell, said strip having a transparency which differs from that of the remainder of said cell;

the value $a$ for the cell of index $nm$ being defined:

$$A_{nm}=\frac{w}{2\pi}\text{ arc sin }\left(\frac{A_{nm}}{A_{max}}\right)$$

$$A_{nm}=\left|\frac{n^2+m^2}{n^2_{max}+m^2_{max}}\right|A_{max}$$

$A_{max}$ is the maximum of the modulus of the filter function, $n_{max}$ is a cell at the outer edge of the mask in the $x$ dimension, $m_{max}$ is a cell at the outer edge of the mask in $y$ dimension, said cells being of a size such that the first diffraction order does not overlap the zero diffraction order, and means for forming an inverse Fourier transform of said object from the modified radiation influenced by said mask.

9. A spatial filter for performing the operation $\partial^2 u/\partial x\partial y$ on a wave which follows the stationary wave equation where $u$ represents the complex amplitude, comprising:

a binary mask, positioned in the Fourier transformation of an object which influences the modified radiation;

said mask having a plurality of cells having a width $w$ and a height $h$ and being identified by a set of indices $n$ and $m$ centered on the optical axis of said wave;

each of said cells containing a strip having a width $a$ the center of said strip being located at a distance $b$ from the center of said cell, said strip having a transparency which differs from that of the remainder of said cell, the value $a$ for the cell of index $nm$ being:

$$a_{nm}=\frac{w}{2\pi}\text{ arc sin }\left(\frac{A_{nm}}{A_{max}}\right)$$

the value $b$ for the cell of index $nm$ being:

$$b_{nm}=\frac{w}{2\pi}\phi_{nm}$$

where $$a_{nm}=\left|\frac{nm}{n_{max}m_{max}}\right|A_{max}$$

$A_{max}$ is the maximum of the modulus of the filter function, $n_{max}$ is a cell at the outer edge of the mask in $x$ dimension, $m_{max}$ is a cell at the outer edge of the mask in $y$ dimension, if $n>0$ and $m<0$ or
if $n<0$ and $m<0$;

$\phi_{nm}=0$ $\phi_{nm}=\pi$ if $n>0$ and $m<0$ or
if $n<0$ and $m>0$, said cells being of a size such that the first diffraction order does not overlap the zero diffraction order.

10. A system for performing the operation $\partial^2 u/\partial x\partial y$ on a wave which follows the stationary wave equation where $u$ represents the complex amplitude, comprising:

a coherent source of radiation;

an object which modifies in phase and/or amplitude;

a portion of the radiation from said source, means for forming a Fourier transform of the object positioned in the path of modified radiation from said source;

a binary mask, positioned in the Fourier transform of said object, which influences the modified radiation;

said mask having a plurality of cells having a width $w$ and a height $h$ and being identified by a set of indices $n$ and $m$ centered on the optical axis of said wave;

each of said cells containing a strip having a width $a$ the center of said strip being located at a distance $b$ from the center of said cell, said strip having a transparency which differs from that of the remainder of said cell, the value $a$ for the cell of index $nm$ being:

$$a_{nm}=\frac{w}{2\pi}\text{ arc sin }\left(\frac{A_{nm}}{A_{max}}\right)$$

the value $b$ for the cell of index $nm$ being:

$$b_{nm}=\frac{w}{2\pi}\phi_{nm}$$

where $$A_{nm}=\left|\frac{nm}{n_{max}m_{max}}\right|A_{max}$$

$A_{max}$ is the maximum of the modulus of the filter function, $n_{max}$ is a cell at the outer edge of the mask in $x$ dimension, $m_{max}$ is a cell at the outer edge of the mask in $y$ dimension, $\phi_{nm}=0$ if $n>0$ and $m<0$ or
if $n<0$ and $m<0$, $\phi_{nm}=\pi$ if $n>0$ and $m<0$ or
if $n<0$ and $m>0$, said cells being of a size such that the first diffraction order does not overlap the zero diffraction order; and means for forming an inverse Fourier transform of said object from the modified radiation influenced by said mask.

11. The system of claim 2 wherein a means for forming a Fourier transform of said first inverse Fourier transform from the modified radiation influenced by said binary mask is included, wherein a second binary mask defined according to claim 2 is positioned in the Fourier transform of said first inverse Fourier transform, and wherein means for forming a second inverse Fourier transform of said first inverse Fourier transform from the modified radiation influenced by said second binary mask is included, whereby the operation $\partial^2 u/\partial x^2$ is performed.

12. The system of claim 11 wherein a second system is included consisting of the elements of said first system of claim 11 beginning with the first means for forming a Fourier transform but with the first and second binary masks of said second system oriented about 90° with respect to the binary masks of said first system, wherein beam splitting means is positioned in the path of modified radiation from said object so that separate portions of said radiation passes through said first and second system, and wherein beam combining means is included for adding the second inverse Fourier transforms of said first and second systems whereby the operation $$\partial^2 u/x^2+\partial^2 u/\partial y^2$$

is performed.

13. The system of claim 2 wherein a means for forming a Fourier transform of said first inverse Fourier transform from the modified radiation influenced by said binary mask is included, wherein a second binary mask defined according to claim 2, but oriented about 90° with respect to the first binary mask, is positioned in the Fourier transform of said first inverse Fourier transform, and wherein means for forming a second inverse Fourier transform of said first inverse Fourier transform from the modified radiation influenced by said second binary mask is included, whereby the operation $\partial^2 u/\partial x \partial y$ is performed.

References Cited

UNITED STATES PATENTS 3,292,148 12/1966 Giuliano et al. ------ 340—146.3

OTHER REFERENCES

Cutrona et al.: Proceedings of the National Electronics Conf., 1959, pp. 262–275.

Brown et al.: Applied Optics, vol. 5, No. 6, June 1966, pp. 967–969.

DAVID SCHONBERG, Primary Examiner

RONALD J. STERN, Assistant Examiner

U.S. Cl. X.R.

235—183; 350—314